(12) United States Patent
Jasch et al.

(10) Patent No.: US 6,945,862 B2
(45) Date of Patent: Sep. 20, 2005

(54) POWER TOOL HAVING A RECEPTACLE FOR SECURING A TOOL

(75) Inventors: Michael Jasch, Pfullingen (DE); Joerg Bortz, Lichtenstein (DE)

(73) Assignee: C. & E. Fein GmbH, (DE)

( * ) Notice: Subject to any disclaimer, the term of this patent is extended or adjusted under 35 U.S.C. 154(b) by 0 days.

(21) Appl. No.: 10/932,427

(22) Filed: Sep. 2, 2004

(65) Prior Publication Data

US 2005/0095966 A1 May 5, 2005

Related U.S. Application Data

(63) Continuation-in-part of application No. 10/003,645, filed on Nov. 2, 2001, now Pat. No. 6,796,888.

(30) Foreign Application Priority Data

Dec. 7, 2000 (DE) .............................. 100 61 559

(51) Int. Cl.⁷ ............................................ B24B 41/00
(52) U.S. Cl. ...................... 451/342; 451/353; 451/359; 451/360; 451/508; 451/509; 451/510; 451/511; 451/512
(58) Field of Search ............................... 451/342, 353, 451/359, 360, 508, 509, 510, 511

(56) References Cited

U.S. PATENT DOCUMENTS

| | | | |
|---|---|---|---|
| 1,947,662 A | 2/1934 | Robinson | 51/168 |
| 4,920,702 A | 5/1990 | Kloss et al. | 51/170 |
| 4,980,976 A | 1/1991 | Junginger et al. | 30/272.1 |
| 5,058,909 A | 10/1991 | Rudolf et al. | 279/8 |
| 5,157,873 A | 10/1992 | Rudolf et al. | 51/158 |
| 5,303,688 A | 4/1994 | Chiuminatta et al. | 125/15 |
| 6,132,300 A * | 10/2000 | Martin | 451/357 |

FOREIGN PATENT DOCUMENTS

| | | |
|---|---|---|
| DE | 1878647 | 8/1963 |
| EP | 0244465 B1 | 11/1986 |
| EP | 369390 A2 | 11/1989 |
| EP | 1034870 A2 | 3/2000 |

* cited by examiner

Primary Examiner—Joseph J. Hail, III
Assistant Examiner—Shantese McDonald
(74) Attorney, Agent, or Firm—St. Onge Steward Johnston & Reens LLC

(57) ABSTRACT

A power tool having a receptacle for securing a tool to a drive shaft thereof is disclosed. The receptacle comprises a receiving opening, preferably being arranged on the tool. The receiving opening engages a securing section preferably being provided in a raised fashion on the drive shaft of the power tool, thereby effecting a positive fit. The securing section comprises a plurality of rounded tips arranged at even radial distances from said longitudinal axis, at angular intervals between each other, each rounded tip having a pair of lateral flanks extending from a common apex toward an intermediate section connecting lateral flanks of a pair of adjacent rounded tips. Preferably the receiving opening comprises a number of rounded tips which is twice the number of rounded tips provided on the raised section.

26 Claims, 3 Drawing Sheets

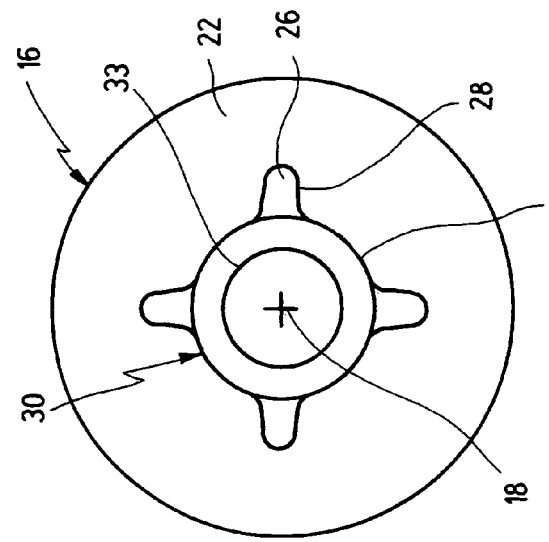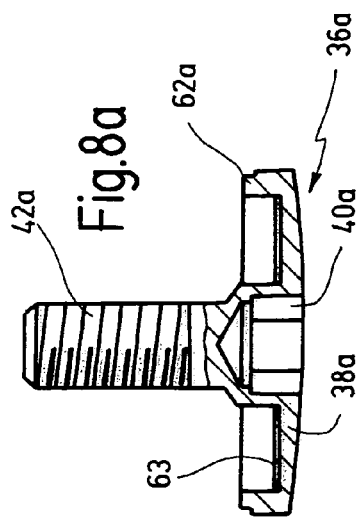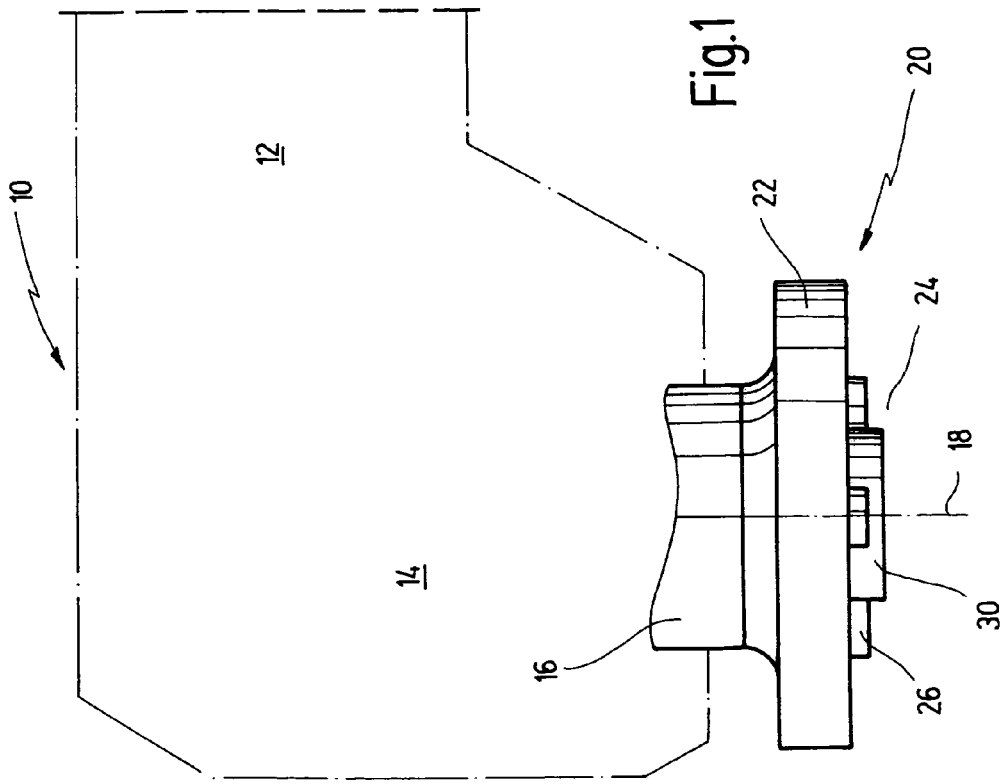

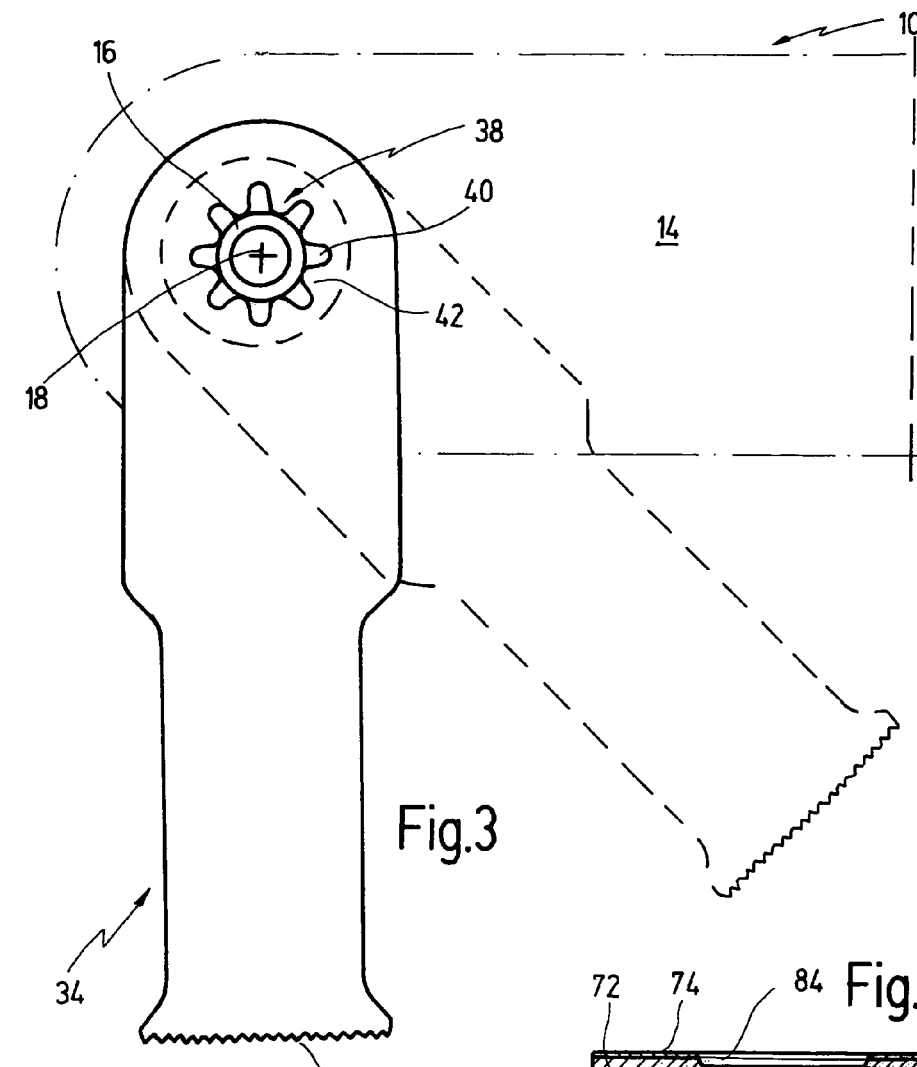
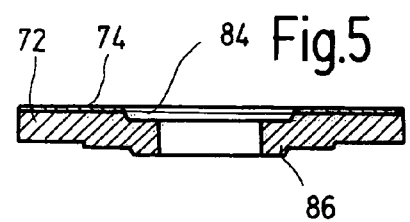
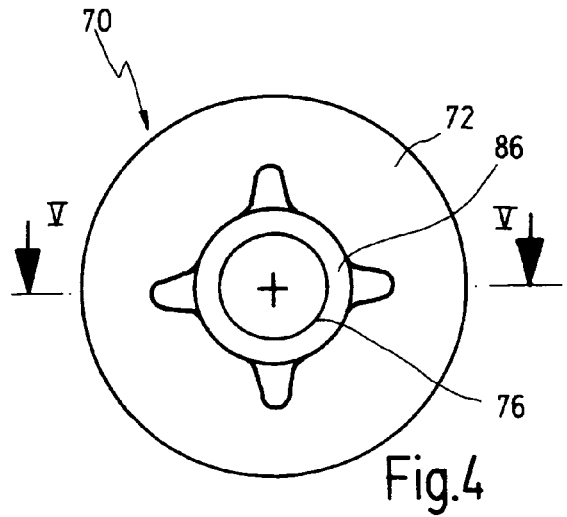
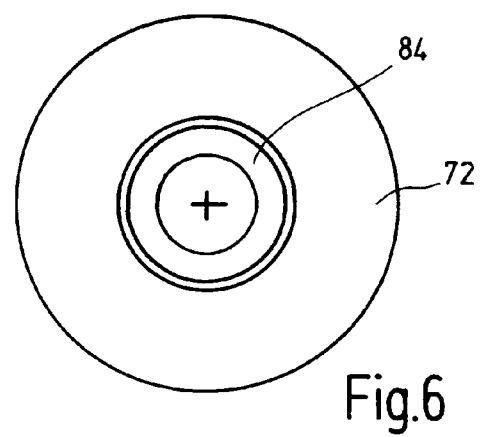

POWER TOOL HAVING A RECEPTACLE FOR SECURING A TOOL

RELATED APPLICATIONS

This application is a continuation-in-part application of U.S. patent application Ser. No. 10/003,645 filed Nov. 2, 2001, now U.S. Pat. No. 6,796,888 claiming priority of German patent application serial number 100 61 559.7 filed on Dec. 7, 2000 which is incorporated herein by reference.

BACKGROUND OF THE INVENTION

The invention relates to a receptacle for securing a tool to a drive shaft of a power tool, a receiving opening being arranged on the tool or on the drive shaft, and a center axis of the drive shaft extending there through, the opening co-acting with a suitably formed securing section arranged in a raised fashion at the other one of the two elements, in order to form a positive engagement for transmitting a torque between the drive shaft and the tool.

The invention further relates to a suitable adapter that can be used, if the receiving opening and the securing section of the tool or of the drive shaft are of different shapes.

A receptacle of the type mentioned at the outset is known from U.S. Pat. No. 4,980,976 which discloses a U-shaped angled cutting knife for severing adhesive beads in window panes of motor vehicles, the cutting knife having a star-shaped receiving opening in the shape of a regular polygon for securing an oscillatingly drivable drive shaft, the receiving opening being attachable to a suitably shaped securing section of the drive shaft. For securing the cutting knife after attaching to the securing section of the drive shaft with its receiving opening, a screw connection is provided, e.g. in form of a nut that can be screwed onto a screw neck of the drive shaft.

Such a receptacle for securing the tool to the drive shaft is provided in particular for oscillatingly drivable tools, in which a positive fit engagement between the drive shaft and the tool for the transmission of higher torques is required.

To this end, a plurality of tools are used, which cannot only be used as cutting knives, but also for other tasks, e.g. for sawing. By means of such oscillatingly driven saw blades, for example, precise cuts in car body working can be performed. For sawing in hard accessible locations, also finger-like tools are used, for instance in order to be able to perform special cuts in wood constructional work. Another field of application is grinding, as e.g. described in U.S. Pat. No. 4,920,702, or scraping.

It has turned out to be disadvantageous that the known receptacle for engagement between the tool and the drive shaft, in particular for such oscillatingly driven tools, tends to wear out after longer operation under high load.

SUMMARY OF THE INVENTION

It is a first object of the invention, to create an improved power tool having an improved receptacle for engagement between the drive shaft and the tool.

It is a second object of the invention, to create an improved receptacle in which the danger of wear out of the receiving opening is reduced and a transmission of high torques is guaranteed also in long-term operation.

It is a third object of the invention, to provide an improved power tool having a receptacle for a tool that is particularly suited for the transmission of high torque even when oscillatingly driven back and forth about a longitudinal axis.

It is a further object of the invention to provide a tool having an improved receptacle in which the danger of wear out of the receiving opening is reduced and a transmission of high torques is guaranteed also in long-term operation.

It is another object of the invention to provide a tool having an improved receptacle for securing to a power tool allowing the transmission of high torque even when oscillatingly driven back and forth about a longitudinal axis.

It is a further object of the invention to provide an adapter that can be used for the engagement between the tool and the drive shaft, if the shapes of the receiving opening and the securing section on the tool and on the drive shaft are different from each other.

It is a still further object of the invention to provide a power tool and a tool matched thereto allowing a positive engagement when attaching the tool in different angular positions on the power tool and allowing an easy adjustment of the angular position.

These and other objects are achieved according to the invention by a receptacle with a receiving opening the shape of which is mated to a securing section of the drive shaft of the power tool, the securing section and the receiving opening having a plurality of rounded tips arranged at a radial distance from the longitudinal axis of the drive shaft, the rounded tips comprising lateral flanks extending toward intermediate sections extending between adjacent rounded tips. The intermediate sections are preferably configured as sections of a circle extending around the longitudinal axis.

By means of the new shape, namely, the occurrence of high torques and/or high surface pressures on any sharp edges like a regular polygon, used in prior art devices, is avoided. Instead, the torque is now mainly transmitted to the tool by lateral flanks forming recesses between the bulges.

By means of such a shape, lumped loads and, thus, high surface pressures are avoided, which occurred up to now in receiving openings in the form of regular polygons.

In that way, a reliable engagement between the tool and the drive shaft is created, by means of which extraordinarily high torques can be transmitted even with oscillating drives or with impact loads, without any danger that the receiving opening or of the securing section may wear out.

In a preferred embodiment of the invention, the receiving opening has eight rounded tips while the raised section provided on the drive shaft has only four rounded tips. The receiving opening and the raised section are preferably matched to each other so as to allow a form-fit connection between said tool and said drive shaft in different angular positions and an adjustment of the angular position in intervals of 45°.

Preferably, the receiving opening is arranged on the tool and the securing section is arranged on the drive shaft.

In that way, a simple manufacture can be reached particularly by punching the receiving opening out of the tool.

According to another embodiment of the invention, the receptacle comprises a securing screw, which can be screwed into a threaded blind hole of the drive shaft.

In this way, the securing screw has preferably a head, which is dimensioned for being positioned onto the tool.

The object of the invention is further achieved by an adapter for clamping a tool, comprising a receiving opening being arranged on a drive shaft of a power tool, which has a securing section, wherein the shape of the receiving opening is not mated with the form of the securing section, wherein an adapter disk is provided on the first side of which a recess is provided, which is mated to the form of the securing section at the drive shaft in order to form a positive fit engagement with same, and on the second side of which a raised second securing section is provided which corresponds to the shape described before.

By using such an adapter, it is possible to use tools, that have already been provided with the receptacle according to the invention on power tools, with drive shafts that have a known securing section. In that way, it is ensured that not all power tools already acquired by users need to be exchanged, if the new tools with the securing section according to the invention are to be used to this end.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

Further features and advantages of the invention can be taken from the following description of preferred embodiments with reference to the drawings. In the drawings:

FIG. 1 shows a very simplified, schematic view of a power tool, the drive shaft of which is provided with a receptacle according to the invention for securing a tool;

FIG. 2 shows a view onto the drive shaft according to FIG. 1 from the outside;

FIG. 3 shows a top view of a tool attached with a receiving opening onto a raised section of a drive shaft of a power tool according to FIG. 1, with an alternative angular position of the tool shown in dotted lines;

FIG. 4 shows a top view of an adapter for attaching a tool having a receiving opening according to the invention to a known power tool having a drive shaft merely comprising a raised cylindrical section for attachment of a tool with a circular receiving opening;

FIG. 5 shows a cross-sectional view of the adapter of FIG. 4 along the line V—V;

FIG. 6 shows a bottom view of the adapter shown in FIG. 4;

FIG. 8a shows a cross-sectional view of a securing screw that can be screwed into a central threaded bole of the drive shaft for securing a tool attached thereto;

DETAILED DESCRIPTION OF THE PREFERRED EMBODIMENTS

Figure 7:
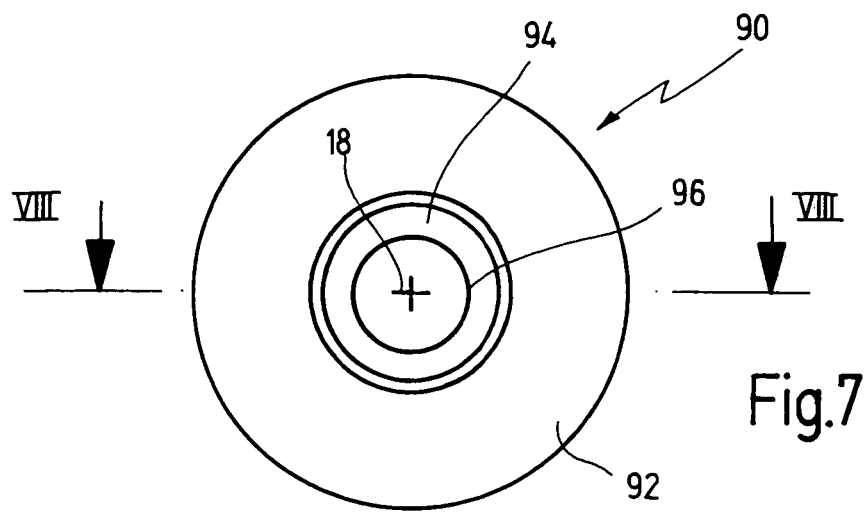
FIG. 7 shows a top view of an alternative embodiment of the adapter shown in FIG. 4.

In FIG. 1, a power tool, which is altogether designated with the numeral 10, is shown in a very schematic fashion. Power tool 10 comprises a drive that is indicated with the numeral 12, which drives a drive shaft 16 via a gear that is indicated with 14. Drive shaft 16 comprises tool support 20 having retaining flange 22 that serves to axially support a tool that can be secured onto a securing section 24 protruding outwardly there from. The retaining flange 22 has an outer diameter that is larger than the diameter of securing section 24. On securing section 24 of drive shaft 16, a tool 34 (shown in FIG. 3) can be mounted and can be fixed to the drive shaft 16 by a screw-connection.

In the present case, power tool 10 is configured such that drive shaft 16 is driven by gear 14 in an oscillating movement back and forth about its longitudinal axis or center axis 18 with a high frequency of e.g. approximately 5000 to 30,000 oscillations per minute and with a small pivot angle of e.g. approximately 0.5° to 5°.

In order to allow a positive engagement between tool and drive shaft 16, securing section 24 of drive shaft 16 has a special shape, by which, together with a suitably formed receiving opening 38 of the tool 34, a positive fit between tool and drive shaft 16 is reached (see FIG. 3).

The shape of the securing section 24, which is matched to the shape of the receiving opening 38 of the tool 34, can be seen in more detail in FIG. 2.

The securing section 24 comprises a cylindrical section 30 axially extending from the retaining flange 22 with a smaller diameter than the retaining flange 22. From the cylindrical section 30 four rounded tips 26 protrude radially outwardly which are arranged around a center axis 18 of drive shaft 16 in regular angular intervals of 90°, respectively. Each rounded tip 26 has an apex from which lateral flanks 28 extend to each side.

The lateral flanks 28 ending in the rounded tips 26 protrude to the outside, leaving cylindrical surface sections 32 between each pair of adjacent tips 26. The rounded tips 26 have a smaller axial length than has the cylindrical section 30. Thus the cylindrical section 30 axially protrudes to a certain amount beyond the rounded tips (see FIG. 1).

The securing section 24 comprises a threaded central bore 33 into which a securing screw 36a (see FIG. 8a) can be screwed for fixing a tool 34 attached with is receiving opening 38 onto the securing section 24. The screw 36a comprises a head 38a which is widened in a flange-like fashion. Head 38a comprises an annular shaped groove 63 at its side facing drive shaft 16, so that at the outer edge an annular protrusion 62a remains, by means of which head 38a can be directly pressed onto the surface of the tool 34 attached to the securing section 24 of the drive shaft 16. Head 38a is equipped with a hexagon socket 40a for receiving a hexagon socket tool.

However, it will be obvious for those skilled in the art, that any kind of screw could be used for securing the tool on the drive shaft.

Although the tool that can be attached to the securing section 24 could generally have any kind of receiving opening allowing attachment to the securing section 24, it is preferred to match the shape of the receiving opening 38 of the tool 34 to the shape of the receiving section 24 in a particular way, as shown in FIG. 3.

In FIG. 3 a tool 34 configured as a cutting tool is shown attached to the securing section 24 of the drive shaft 16 of the power tool 10.

While the securing section 24 of the power tool 10 comprises four rounded tips 26, the receiving opening 38 of the tool 34 comprises eight rounded tips 40 the shape and size of which are matched to the rounded tips 26 provided on the securing section 24 of the drive shaft 16. Each pair of adjacent rounded tips 40 of the receiving opening 38 of the tool 34 is connected by arch-shaped lateral flanks forming recesses 42 between the tips 40, the lateral flanks extending from the pair of adjacent tips 40 toward the longitudinal axis 18 and converging in a common apex of the respective recess 42.

Since the securing section 24 of the drive shaft is configured cylindrical leaving cylindrical surface sections 32 between each pair of adjacent tips 26 extending outwardly, there is space for receiving each recess 42 formed between adjacent tips 40 of the receiving opening. Thus it is possible to mount the tool 34 in eight different angular positions on the drive shaft 16 of the power tool 10. The tool 34 can be angularly adjusted in increments of 45 degrees. This is indicated in FIG. 3 by the dashed outline indicating a position of the tool 34 which is rotated by 45 degrees about the longitudinal axis 18 with respect to the position shown in full lines.

Angular adjustment of the tool 34 is facilitated by the fact that the cylindrical section 30 axially protrudes beyond the rounded tips 26 to a certain extent. Thus the tool 34 can initially be placed with its receiving opening 38 on the cylindrical section 30 of the drive shaft 16 and can then be rotated into the desired angular position on the cylindrical section 30 until the tips 40 of the tool 34 match with the tips 26 of the securing section 24 thus allowing the tool to axially slide over the tips 26 of the securing section 24 until it rests against the retaining flange 22. Thereafter the tool can fixed by attaching a securing screw 36a such as shown in FIG. 8a.

The cost of manufacture of the drive shaft 16 is reduced when compared to a drive shaft having more than four tips, such as six or eight tips, since the relatively expensive milling operation for producing the securing section 24 is simplified. On the other hand the cost of producing the receiving opening 38 on the tool 34 is not increased, since usually such receiving openings are produced by a stamping operation.

By means of a positive engagement between receiving opening and securing section, a positive force transmission between tool and drive shaft is made possible, wherein, at the same time, the danger that the receiving opening or the rounded tips of the securing section wear out is prevented even when high torques are transmitted under oscillating load or even under impact load. This is mainly achieved by the fact that the lateral flanks of curved sections 28 extend almost radially in partial sections.

By reference to FIGS. 4 through 6, an adapter will be explained in the following. The adapter allows to clamp a tool, that is configured with a receiving opening formed according to the invention, onto the drive shaft of a power tool, the power tool being configured with a securing section of known design, e.g. having merely a cylindrical securing section without any means for effecting a positive engagement between the tool and the drive shaft. In that way, tools provided with the new receptacle can also be used for already existing power tools, whereby it can be prevented that different tools have to be manufactured beside one another, as, for existing power tools, of course, suitable tools still have to be provided.

The adapter designated altogether with the numeral 70 comprises an adapter disk 72. Adapter disk 72 has a cylindrical recess 84 on its side facing the drive shaft, this recess being mated in its shape and size with the shape of a securing section of a drive shaft of a power tool of known design. In the case shown, the securing section of the drive shaft known in the art is configured merely cylindrical having a central threaded bore for attaching a securing screw.

On the opposite side facing away from drive shaft, adapter disk 72 is configured with a raised securing section 86, which corresponds to the shape of the securing section 24 shown in FIGS. 1 and 2.

The adapter 70 is penetrated by an axial bore 76 allowing to insert a securing screw there through into the threaded bore of the drive shaft.

On its side facing the drive shaft the adapter 70 may comprise a hard metal granulate coating such as indicated by reference numeral 74 in FIG. 5. This helps to increase frictional engagement with the drive shaft of the power tool thus allowing a better torque transmission from the drive shaft to the tool even with existing machines without positive engagement.

It will be understood that the adapter disk on its side facing the drive shaft could also have any other shape matched to the shape the securing section of a power tool known in the art. Thus the recess 84 might have e.g. a hexagonal shape, if the drive shaft of the prior art power tool is of hexagonal design for positive engagement with a hexagonal receiving opening of a tool.

Again, the securing screw 36a of FIG. 8a may be used for securing the tool together with the adapter 70 onto the drive shaft of the power tool.

Figure 8:
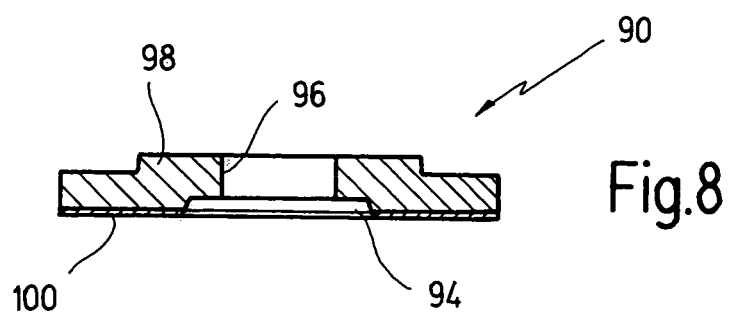
FIG. 8 shows a cross-sectional view of the adapter of FIG. 7 along the line VIII—VIII.
Figure 9:
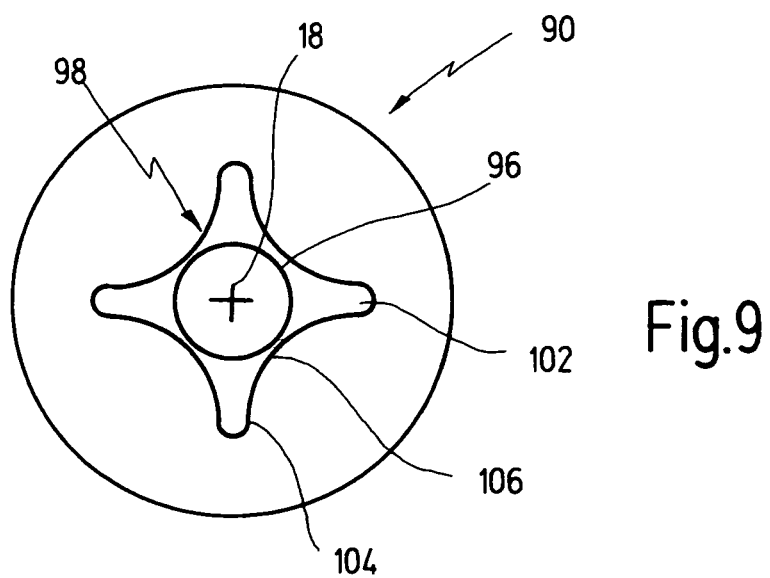
FIG. 9 shows a bottom view of the adapter shown in FIG. 7.

With reference to FIGS. 7 through 9, an alternative design of an adapter 90 will be described, which can be used for clamping tools of the inventive design onto power tools, the drive shaft of which comprises a securing section of known cylindrical design without any means for positive engagement.

Adapter 90 comprises an adapter disk 92, which is penetrated by an axial bore 96 for inserting a securing screw there through. On its side facing the drive shaft the adapter 90 also comprises a cylindrical recess 94 allowing a fitting onto a cylindrical receiving section of a conventional power tool.

Also on this side a hard metal granulate coating 100 may be provided to improve torque transmission as explained before with respect to the embodiment described with reference to FIGS. 4 through 6.

The single difference between the adapter 70 according to FIGS. 4 through 6 and the adapter 90 according to FIGS. 7 through 9 rests in a different kind of securing section 98 for securing a tool 34 having a receiving opening 38 as shown in FIG. 3 on a drive shaft of a known configuration.

The securing section 98 also comprises four rounded tips 102 the shape of which is identical to the shape of the rounded tips 26 of the drive shaft of FIG. 2. However, by contrast to the embodiment shown in FIGS. 1 and 2, the securing section 98 does not comprise any cylindrical section. Instead the rounded tips 102 comprise arch-shaped lateral flanks 104 that form recesses 106 between adjacent tips 102. From each pair of adjacent tips 102 the respective lateral flanks 104 converge in a common apex closer to the longitudinal axis 18 than are the tips 102.

Also such a design is possible to receive the receiving opening 38 of a tool shown in FIG. 3 having eight rounded tips 40. If desired, also the securing section 24 of the drive shaft 16 shown in FIGS. 1 and 2 could be designed accordingly.

While the design of FIGS. 7 through 9 leads to a very even torque transmission between the drive shaft and the tool, the design according to FIGS. 1 and 2 is somewhat easier to produce by milling and offers the additional advantage that the tool can initially be placed on the cylindrical section and is centered thereby during angular adjustment until its final position is reached for securing by attaching a securing screw.

What is claimed is:
1. A power tool comprising
a motor-driven drive shaft having a longitudinal axis and having a free end;
a securing section provided on said free end of said drive shaft for engaging a receiving opening provided on said tool;
said securing section comprising four rounded tips arranged at equal radial distances from said longitudinal axis, at angular intervals of 90° between each other, each rounded tip having a pair of lateral flanks extending from a common apex toward a section of a circle extending around said longitudinal axis.

2. A power tool comprising
a motor-driven drive shaft having a longitudinal axis and having a free end;
a securing section provided on said free end of said drive shaft for engaging a receiving opening provided on said tool;
said securing section comprising a cylindrical section from which protrude to the outside a plurality of rounded tips arranged at equal radial distances from said longitudinal axis, at equal angular intervals between each other, each rounded tip having a pair of lateral flanks extending from said rounded tip and ending in said cylindrical section.

3. The power tool of claim 2, wherein said securing section comprises four rounded tips.

4. The power tool of claim 2, further comprising a threaded blind hole arranged on said drive shaft, and further comprising a securing screw adapted for screwing into said threaded blind hole for securing a tool on said securing section.

5. A power tool comprising
a motor-driven drive shaft having a longitudinal axis and having a free end;
a securing section provided on said free end of said drive shaft for engaging a receiving opening provided on said tool;
said securing section comprising four rounded tips arranged at a radial distance from said longitudinal axis, said rounded tips being connected by lateral flanks forming recesses between said tips;
wherein each of said rounded tips form a pair of tips with each adjacent tip, each said pair of adjacent tips being continuously connected by lateral flanks extending from said pair of adjacent tips toward said longitudinal axis and converging in a common apex.

6. The power tool of claim 5, further comprising a threaded blind hole arranged on said drive shaft, and further comprising a securing screw adapted for screwing into said threaded blind hole for securing a tool on said securing section.

7. A combination of a power tool and a tool comprising:
a motor-driven drive shaft having a longitudinal axis and having a free end;
a securing section provided on said free end of said drive shaft for engaging a receiving opening provided on said tool;
said securing section comprising n rounded tips arranged at even radial distances from said longitudinal axis, at angular intervals between each other, each rounded tip having a pair of lateral flanks extending from a common apex toward an intermediate section connecting lateral flanks of a pair of adjacent rounded tips; and
and a tool comprising a receiving opening defining a longitudinal axis extending there through, said receiving opening comprising 2n rounded tips arranged at a radial distance from said longitudinal axis, said rounded tips being connected by lateral flanks forming recesses between said rounded tips;
wherein n is any natural number greater than 1; and
wherein said securing section of said drive shaft and said receiving opening of said tool are matched to each other so as to allow a positive engagement of said tool with said securing section.

8. The tool of claim 7, wherein said lateral flanks are arch-shaped.

9. A tool comprising a receiving opening defining a longitudinal axis extending there through, said receiving opening comprising eight bulges arranged at a radial distance from said longitudinal axis, said bulges being connected by lateral flanks forming recesses between said bulges.

10. A tool comprising a working section and a holding section, said holding section having a receiving opening defining a longitudinal axis extending there through, said receiving opening being configured for attachment to an end of a drive shaft of a motor-driven power tool, said holding section having a surface facing said end of said drive shaft, said holding section on its surface facing the drive shaft further comprising a coating comprising a friction enhancing material.

11. The tool of claim 10, wherein said coating is a hard metal granulate coating.

12. A tool comprising a working section and a holding section, said holding section having a receiving opening defining a longitudinal axis extending there through, said receiving opening being configured for attachment to an end of a drive shaft of a motor-driven power tool, said receiving opening comprising eight rounded tips arranged at a radial distance from said longitudinal axis, said rounded tips being connected by lateral flanks forming recesses between said tips.

13. The tool of claim 12, wherein said holding section has a surface facing the drive shaft and comprising a coating made of a friction enhancing material.

14. An adapter for securing a tool having a holding section comprising a receiving opening to a securing section of a drive shaft of a power tool, said adapter comprising:
an adapter disk comprising a longitudinal axis and having a first side facing said power tool and a second side facing said tool;
a recess arranged on said first side, and having a certain shape for engaging said securing section of said power tool;
a raised section arranged on said second side, said raised section having a shape being different from the shape of said recess, said raised section comprising a cylindrical section from which at least three rounded tips arranged at even angular intervals between each other protrude to the outside.

15. The adapter of claim 14, wherein said cylindrical section defines a free end of said drive shaft axially protruding beyond said rounded tips.

16. The adapter of claim 14, wherein said raised section comprises four rounded tips.

17. The adapter of claim 14, wherein a coating comprising a friction enhancing material is applied to a surface of said first side facing said drive shaft.

18. The tool of claim 17, wherein said coating comprises a hard metal granulate coating.

19. The adapter of claim 14, further comprising a threaded blind hole arranged on said drive shaft, and further comprising a securing screw having a threaded portion adapted for screwing into said threaded blind hole for securing a tool on said securing section.

20. An adapter for securing a tool having a holding section comprising a receiving opening to a securing section of a drive shaft of a power tool, said adapter comprising:
an adapter disk comprising a longitudinal axis and having a first side facing said power tool and a second side facing said tool;
a recess arranged on said first side, and having a certain shape for engaging said securing section of said power tool;

a raised section arranged on said second side, said raised section having a shape being different from the shape of said recess, said holding section on its surface facing the drive shaft further comprising a coating comprising a friction enhancing material.

21. The tool of claim 20, wherein said coating is a hard metal granulate coating.

22. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side, and having a certain shape for engaging said securing section of said power tool;

a raised section arranged on said second side, said raised section having a shape being different from the shape of said recess, said raised section comprising a cylindrical section from which at least three rounded tips arranged at even angular intervals between each other protrude to the outside.

23. An adapter for securing a tool having a receiving opening to a securing section of a drive shaft of a power tool, said adapter comprising:

an adapter disk comprising a longitudinal axis and having a first side facing said power tool and a second side facing said tool;

a recess arranged on said first side, and having a certain shape for engaging said securing section of said power tool;

a raised section arranged on said second side, said raised section having a shape being different from the shape of said recess, said raised section comprising four rounded tips arranged at a radial distance from said longitudinal axis, said tips being connected by lateral flanks forming recesses between said tips;

wherein each of said tips forms a pair of tips with each adjacent tip, each said pair of adjacent tips being continuously connected by lateral flanks extending from said pair of adjacent tips toward said longitudinal axis and converging in a common apex.

24. The adapter of claim 23, wherein a coating comprising a friction enhancing material is applied to a surface of said first side facing said drive shaft.

25. The tool of claim 24, wherein said coating comprises a hard metal granulate coating.

26. The adapter of claim 24, further comprising a threaded blind hole arranged on said drive shaft, and further comprising a securing screw having a threaded portion adapted for screwing into said threaded blind hole for securing a tool on said securing section.

* * * * *